US007925966B2

(12) United States Patent
Kaler et al.

(10) Patent No.: US 7,925,966 B2
(45) Date of Patent: Apr. 12, 2011

(54) GROUPING AND NESTING HIERARCHICAL NAMESPACES

(75) Inventors: Christopher G. Kaler, Sammamish, WA (US); Allen L. Brown, Bellevue, WA (US); Robert G. Atkinson, Woodinville, WA (US); Steven E. Lucco, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1601 days.

(21) Appl. No.: 11/227,785

(22) Filed: Sep. 15, 2005

(65) Prior Publication Data

US 2006/0010372 A1 Jan. 12, 2006

Related U.S. Application Data

(63) Continuation of application No. 10/264,233, filed on Oct. 3, 2002, now Pat. No. 6,993,714.

(51) Int. Cl.
*G06F 17/00* (2006.01)

(52) U.S. Cl. ........................................ 715/200; 715/234

(58) Field of Classification Search .................. 715/201, 715/205, 212, 229, 230, 234, 235, 236, 239, 715/240, 255, 273, 513, 700, 723, 762, 765, 715/200; 717/114; 719/319, 328
See application file for complete search history.

(56) References Cited

U.S. PATENT DOCUMENTS

| | | | |
|---|---|---|---|
| 6,292,836 B1 | 9/2001 | Teraoka | |
| 6,356,906 B1 | 3/2002 | Lippert | |
| 6,675,353 B1 * | 1/2004 | Friedman | 715/239 |
| 6,763,499 B1 | 7/2004 | Friedman | |
| 6,795,819 B2 * | 9/2004 | Wheeler et al. | 707/691 |
| 6,802,059 B1 | 10/2004 | Lyapustina | |
| 6,859,810 B2 | 2/2005 | Andrei | |
| 6,868,423 B2 * | 3/2005 | Ohta et al. | 1/1 |
| 6,880,125 B2 * | 4/2005 | Fry | 715/234 |
| 6,918,107 B2 | 7/2005 | Lucas | |
| 6,993,714 B2 * | 1/2006 | Kaler et al. | 715/234 |
| 7,036,073 B2 * | 4/2006 | Jones et al. | 715/237 |
| 7,065,561 B2 * | 6/2006 | Fry et al. | 709/219 |
| 7,165,239 B2 | 1/2007 | Hejisberg | |
| 7,171,481 B2 | 1/2007 | Hayashi | |
| 7,260,555 B2 | 8/2007 | Rossmann et al. | |
| 7,613,997 B2 * | 11/2009 | Kaler et al. | 715/234 |

(Continued)

OTHER PUBLICATIONS

Oliver, Dick .NPL Reference U: Sam Teach Yourself HTML in 24 hours, 4th ed.; Publishing Date: Sep. 17, 1999.*

(Continued)

*Primary Examiner* — Doug Hutton
*Assistant Examiner* — Soumya Dasgupta
(74) *Attorney, Agent, or Firm* — Workman Nydegger

(57) ABSTRACT

A group identifier represents an association between each of a number of different abbreviated namespace identifiers with a corresponding hierarchical namespace (e.g., an XML namespace). A hierarchically-structured document (e.g., an XML document) is accessed by a computing system that determines that the group identifier is associated with the hierarchically-structured document. Hence, when using the abbreviated namespace identifiers in the hierarchically-structured document, the computing system knows that the corresponding namespace is associated with the designated portions of the hierarchically-structured document. Also, a schema description language document (e.g., an XSD document) may specify multiple target namespaces for a single element. Accordingly, groupings of elements may be included in different namespaces to creating overlapping or even nested namespaces.

5 Claims, 5 Drawing Sheets

U.S. PATENT DOCUMENTS

| | | | |
|---|---|---|---|
| 2002/0107872 A1* | 8/2002 | Hudis et al. | 707/104.1 |
| 2003/0149934 A1* | 8/2003 | Worden | 715/513 |
| 2003/0200184 A1 | 10/2003 | Dominquez | |
| 2004/0024764 A1 | 2/2004 | Hsu | |
| 2004/0068694 A1* | 4/2004 | Kaler et al. | 715/513 |
| 2004/0199524 A1* | 10/2004 | Rys et al. | 707/100 |
| 2006/0080600 A1 | 4/2006 | Kaler | 715/500 |

OTHER PUBLICATIONS

Marchal, Benoit. NPL Reference V: "XML by Example"; Publishing Date: Dec. 14, 1999.*

Skogan, David. "UML as a Schema Language for XML Based Data Interchange." Copyright May 14, 1999.* de Vos et al. "XML for CIM Model Exchange." IEEE. Copyright 1999.*

Klarlund et al. "DSD: A Schema Language for XML." Copyright 2000.*

Klein et al. "The Relation Between Ontologies and Schema-Languages."*

Newcomer, Eric. "Understanding Web Services: XML, WSDL, SOAP, and UDDI." Copyright 2002.*

Office Action dated Mar. 18, 2005 cited in U.S. Appl. No. 10/264,233.

Notice of Allowance dated Sep. 8, 2005 cited in U.S. Appl. No. 10/264,233.

Office Action dated Dec. 23, 2008 cited in U.S. Appl. No. 11/260,656.

James Clark "XML Namespaces" 1999, pp. 1-4.

U.S. Appl. No. 11/260,656, Jul. 1, 2009, Notice of Allowance.

* cited by examiner

GROUPING AND NESTING HIERARCHICAL NAMESPACES

CROSS-REFERENCE TO RELATED APPLICATIONS

This application is a continuation of application Ser. No. 10/264,233, filed Oct. 3, 2002, and entitled "GROUPING AND NESTING HEIARCHICAL NAMESPACES" and which is incorporated here by reference.

BACKGROUND OF THE INVENTION

1. The Field of the Invention

The present invention relates to networking technologies, and more specifically to mechanisms for using a group identifier to represent mappings of each of a number of abbreviated namespace identifiers to a hierarchical namespace used to uniquely identify an element (such as an XML element) of hierarchical document (such as an XML document), and also more specifically to mechanisms for developing overlapping namespaces.

2. Background and Relevant Art

Computing systems have revolutionized the way people work and play. Never before have so many had so much access to so much information. All one needs to access digital information and communicate throughout the globe is as an Internet-enabled computing system such as a desktop computer, a laptop computer, a Personal Digital Assistant (PDA), a mobile telephone, or the like.

When two computing systems communicate, it is helpful if the two computing systems not only communicate the data itself, but also understand the underlying meaning of the data so that intelligent decisions can be made based on that data. For example, suppose that a computing system receives the number "84111". It would be helpful for the computing system to determine what is being communicated, not just that the number was communicated. For example, it would be helpful to know whether the number is a residence street number, a postal zip code, a number of widgets ordered, a product serial number, or some other meaning. Appropriate action taken by the computing system depends on what the number represents.

In order to allow meaning of data, rather than just the data itself, to be communicated, a technology called "schemas" has been developed. Schemas define how a particular item of data is structured. The eXtensible Markup Language (XML) has been widely adopted as a language in which structured data may be represented. For example, consider the following example Extensible Markup Language element:

```
<Address>
    <Street>34 West Ninth Street</Street>
    <City>Ideaville</City>
    <State>Kansas</State>
    <Country>United States</Country>
    <PostalCode>54321</PostalCode>
</Address>
```

The XML element is of a type "address" or in other words is an address XML element. The address element has a number of subelements including a street element, a city element, a state element, a country element, and a postal code element. Human readers have the intuition and experience to understanding that this element represents a physical United States postal address of 34 West Ninth Street, Ideaville, Kans., 54321.

Although obvious to human readers, computing systems do not have the same experience and intuitive reasoning ability as does the complex human brain. Accordingly, computing systems need some understanding of the structure of the XML element in order make decisions based on the understanding that the XML element indeed represents a United States physical postal address.

Schemas provide precisely that structural understanding. One technology that enables the defining of schemas is called the XML Schema Description (XSD) document. XSD documents are XML documents themselves and define elements, their associated subelements, and what the meaning of the elements and subelements and associated attributes are XSD documents may also define how many times (zero or more) a subelement may appear at a particular location in an XML element. For example, a schema that defines a structure for contact information may have defined the address XML element provided above.

XML has been so widely adopted as a means for communicating structured data, that it is not unusual for different schemas to generate the same name for differently structured XML element. For example, consider the following XML element also of the type "address" and also being an address XML element:

<Address>123.45.67.8</Address>

This address XML element has a much simpler structure. A human reader can clearly see that this address XML element does not represent a United States physical postal address at all. One of ordinary skill in the art would also likely be able to recognize the XML element as a network Internet Protocol (IP) address. A schema may also be used to define this address XML element.

With the widespread implementation of XML, one can easily envision that there could be a wide variety of other address XML elements that follow different structures. For example, there may be many different address XML elements of different structures that define a United States postal address. For example, there may be some XML elements that provide the street number as a separate field, instead of in the same name as the street. There may be some that list the country first before the street address. Also, there may be different address XML elements to represent different address format recognized throughout the globe. Also, there may be address XML elements that represent computer addresses or the like.

Accordingly, when reading an XML address element, it would be very difficult for a computing system to understand the structure of the XML element since there may be many different schema documents that define different and inconsistent structures of an address. XML element. In order to allow computing systems to resolve this kind of X ambiguity and thus uniquely identify the structure of an XML element, even when the number of XML element types having that same "address" type is numerous, a two part naming mechanism is in widespread use.

One part of the XML naming mechanism is the type of the element. For example, the type of the above XML elements is "address". A second part of the XML naming mechanism is called a "hierarchical namespace". Typically, this namespace is represented in the XML document in a similar manner as attribute of the element and may take the form of a Uniform Resource Identifier. Together, the element type and the namespace uniquely identify the XML element. The schema description document itself defines a corresponding namespace that is to be associated with the XML element. Accordingly, the computing system can uniquely identify and validate the structure of an XML element based on its type and namespace, even if there are numerous schemas that define XML elements having the same type, but with different namespaces.

As previously mentioned, namespaces may take the form of a URI. These URIs can include a long sequence of characters ranging from about 10 characters to 50 or more characters. An XML document may contain a number of different XML elements associated with a number of different namespaces. Such an XML document typically includes at least one express recitation of each of the URIs corresponding to the different namespaces, even though a namespace declared on one element is inherited unless expressly overwritten in its subelements. The express recitation of these namespace URIs can significantly increase the size of an XML document, especially when the XML document includes elements associated with different namespaces.

One conventional method for reducing the size of such XML documents is to provide an association between an abbreviated namespace identifier and a corresponding namespace URI with the namespace is first declared for an element. This association is often called herein a "namespace declaration." Should the namespace URI be required to be associated with another XML element, the abbreviated namespace identifier is used instead of the full namespace URI in order to provide the association between the namespace and the XML element. The following XML document is an example of an XML element in the form of a Simple Object Access Protocol (SOAP) envelope in which line numbers are added for purposes of clarity. Note the use of abbreviated namespace identifiers:

```
1.    <S:Envelope xmlns:S="soap uri">
2.        <S:Header>
3.            <p:policy xmlns:p="policy uri">...</p:policy>
4.            <s:security xmlns:s="security uri">...</s:security>
5.            <t:timestamp xmlns:t="timestamp uri">...</t:timestamp>
6.            <q:session xmlns:q="session uri">...</q:session>
7.            <r:reliability xmlns:r="reliability uri">...</r:reliability>
8.        </S:Header>
9.        <S:Body>
10.           <x:myElement xmlns:x="x uri">
11.               ...
12.           </x:myElement>
13.       </S:Body>
14.   </S:Envelope>
```

Line 1 identifies the XML element from line 1 to line 14 as a SOAP envelope. The text "xmlns:S='soap uri'" is called a namespace declaration in which the abbreviated namespace identifier "S" is associated with the "soap uri". Note that a lengthy namespace URI would replace the term "soap uri" in line 1. Similarly, abbreviated namespace identifiers are included for "p", "s", "t", "q", "r" and "x" in corresponding lines 3, 4, 5, 6, 7 and 10. These abbreviated namespace identifiers may then be used to provide an association between a namespace URI and an XML element. Although the use of abbreviated namespace identifiers does not reduce the size of the above-listed SOAP envelope example, should the SOAP envelope have provided further XML elements that followed one of the declared namespaces, the namespace abbreviator could have been used, rather than recited the entire namespace URI.

Even though abbreviated namespace identifiers are used, XML document drafters may elect to recite the entire namespace URI instead of just the abbreviator. For example, if the XML element were to be signed, one might want to redeclare the namesapce using the full namespace URI rather than using the abbreviator as a namespace prefix in order to ensure that the namespace association survives through any subsequent signing operation.

Even when abbreviated namespace identifiers are used, the express namespace URI is included at least once, if not many more times, throughout the XML document. Accordingly, what is desired are methods, systems, computer program products and data structures that reduce the size of a hierarchical document such as an XML document while preserving namespace associations.

Also, in conventional schema description documents, each defined XML element schema is assigned to only one namespace. This restricts the configuration of namespaces and does not allow for efficient overlapping or nesting of namespaces in the manner described in the below-included detailed description of the preferred embodiments.

BRIEF SUMMARY OF THE INVENTION

The foregoing problems with the prior state of the art are overcome by the principles of the present invention, which are directed towards methods, systems, computer program products, and data structures for using a group identifier that represents an association between each of a number of different abbreviated namespace identifiers with a corresponding hierarchical namespace such as an XML namespace. A hierarchically-structured document such as an XML document is accessed by a computing system that determines that the group identifier is associated with the hierarchically-structured document. Hence, when using the abbreviated namespace identifiers in the hierarchically-structured document, the computing system knows that the corresponding namespace is associated with the designated portions of the hierarchically-structured document.

In one embodiment, the association between each of the number of abbreviated namespace identifiers and the corresponding namespace URI need not be expressly included in the hierarchically-structured document. Instead, the computing system knows to assume the associations between the abbreviations and the full namespace URI whenever the group identifier appears in the document. Alternatively, the group identifier may be found not within the hierarchically-structured document, but within a pre-processor directive, or perhaps even imposed by the schema description document that defines all or some of the elements in the hierarchically-structured document.

The group identifier may be dynamically defined by including the group identifier and the corresponding abbreviated namespace associations expressly within a hierarchically-structured document. The receiving computing system may then determine that the corresponding associations are to be made for future hierarchically-structured documents received from the same source whenever that group identifier is included. Accordingly, entire groupings of associations between abbreviated namespace identifiers and corresponding namespaces may be made without even including any of the namespace URI in the hierarchically-structured document itself. Accordingly, the size of the hierarchically-structured document may be significantly reduced thereby preserving network bandwidth if transmitted, storage space if stored, and processing resources if processed.

In accordance with another embodiment of the present invention, a schema description language document may specify multiple target namespaces for a single element.

Accordingly, groupings of elements may be included in different namespaces to creating overlapping or even nested namespaces. This allows for the efficient and flexible generation of namespaces and provides for a wider selection and hierarchical organization of namespaces.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

An identifier (also called herein a "group identifier") is used to represent an association between each of a number of different abbreviated namespace identifiers with a corresponding hierarchical namespace (e.g., an XML namespace). A hierarchically-structured document (e.g., an XML document) is accessed by a computing system that determines that the group identifier is associated with the hierarchically-structured document. Hence, when using the abbreviated namespace identifiers in the hierarchically-structured document, the computing system knows that the corresponding namespace is associated with the designated portions of the hierarchically-structured document. This may even be accomplished without including an expression of the association within the hierarchically-structured document itself, thereby reducing the size of the hierarchically-structured document.

Embodiments within the scope of the present invention include computer-readable media for carrying or having computer-executable instructions or data structures stored thereon. Such computer-readable media can be any available media which can be accessed by a general purpose or special purpose computer. By way of example, and not limitation, such computer-readable media can comprise computer storage media and communication media. Computer storage media may comprise RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

When information is transferred or provided over a network or another communications connection (either hardwired, wireless, or a combination of hardwired or wireless) to a computer, the computer properly views the connection as a communication medium. Combinations of the above should also be included within the scope of computer-readable media. Computer-executable instructions comprise, for example, any instructions and data which cause a general purpose computer, special purpose computer, or special purpose processing device to perform a certain function or group of functions. The computer-executable instruction may be, for example, binaries, intermediate format instructions such as assembly language, or even source code.

Figure 1:
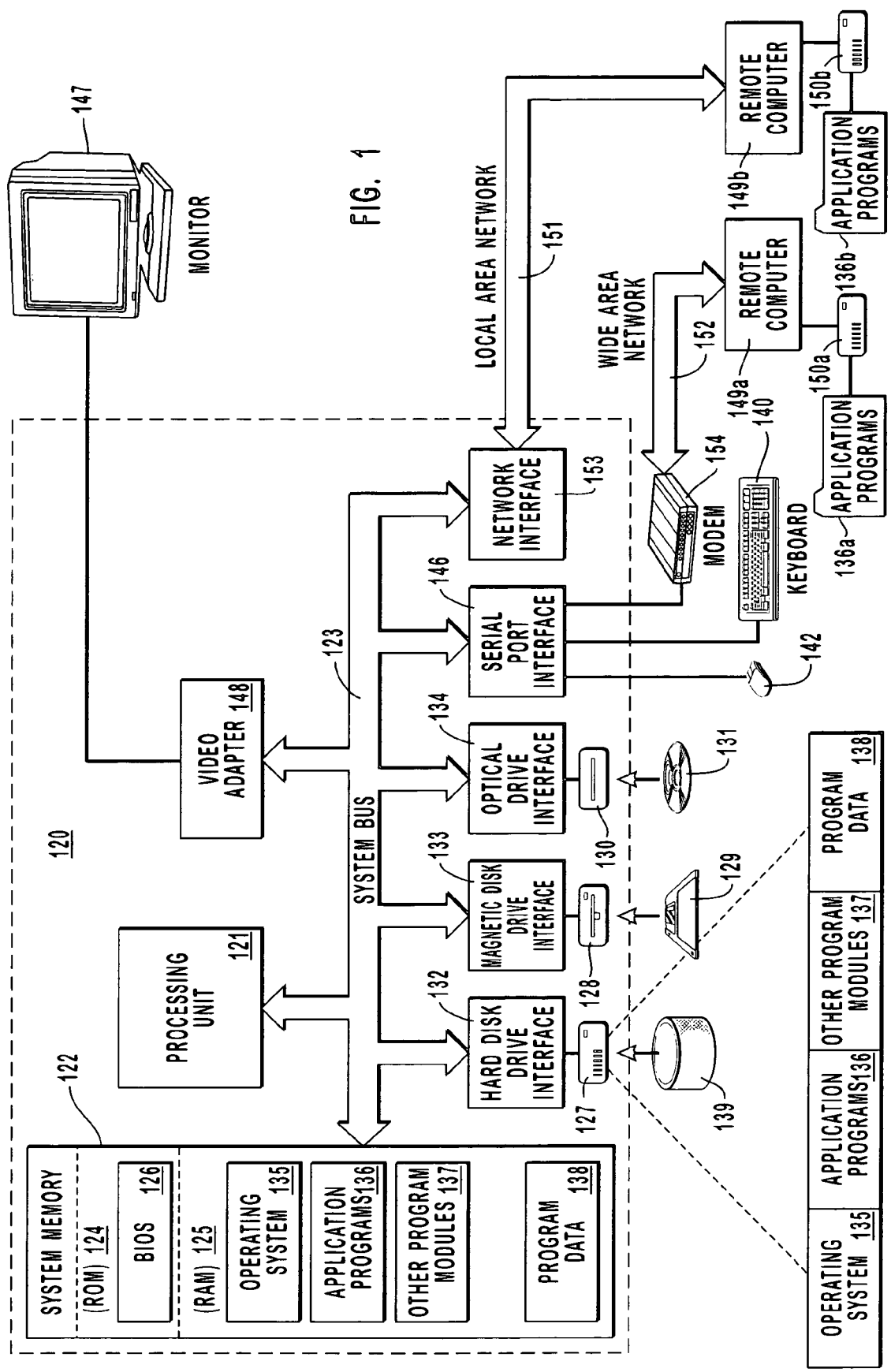
FIG. 1 illustrates a suitable operating environment for the principles of the present invention.

FIG. 1 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 1, an exemplary system for implementing the invention includes a general purpose computing device in the form of a conventional computer 120, including a processing unit 121, a system memory 122, and a system bus 123 that couples various system components including the system memory 122 to the processing unit 121. The system bus 123 may be any of several types of bus structures including a memory bus or memory controller, a peripheral bus, and a local bus using any of a variety of bus architectures. The system memory includes read only memory (ROM) 124 and random access memory (RAM) 125. A basic input/output system (BIOS) 126, containing the basic routines that help transfer information between elements within the computer 120, such as during start-up, may be stored in ROM 124.

The computer 120 may also include a magnetic hard disk drive 127 for reading from and writing to a magnetic hard disk 139, a magnetic disk drive 128 for reading from or writing to a removable magnetic disk 129, and an optical disk drive 130 for reading from or writing to removable optical disk 131 such as a CD-ROM or other optical media. The magnetic hard disk drive 127, magnetic disk drive 128, and optical disk drive 130 are connected to the system bus 123 by a hard disk drive interface 132, a magnetic disk drive-interface 133, and an optical drive interface 134, respectively. The drives and their associated computer-readable media provide nonvolatile storage of computer-executable instructions, data structures, program modules and other data for the computer 120. Although the exemplary environment described herein employs a magnetic hard disk 139, a removable magnetic disk 129 and a removable optical disk 131, other types of computer readable media for storing data can be used, including magnetic cassettes, flash memory cards, digital video disks, Bernoulli cartridges, RAMs, ROMs, and the like.

Program code means comprising one or more program modules may be stored on the hard disk 139, magnetic disk 129, optical disk 131, ROM 124 or RAM 125, including an operating system 135, one or more application programs 136, other program modules 137, and program data 138. A user may enter commands and information into the computer 120 through keyboard 140, pointing device 142, or other input devices (not shown), such as a microphone, joy stick, game pad, satellite dish, scanner, or the like. These and other input devices are often connected to the processing unit 121 through a serial port interface 46 coupled to system bus 123. Alternatively, the input devices may be connected by other interfaces, such as a parallel port, a game port or a universal serial bus (USB). A monitor 147 or another display device is also connected to system bus 123 via an interface, such as video adapter 148. In addition to the monitor, personal computers typically include other peripheral output devices (not shown), such as speakers and printers.

The computer 120 may operate in a networked environment using logical connections to one or more remote computers, such as remote computers 149a and 149b. Remote computers 149a and 149b may each be another personal computer, a server, a router, a network PC, a peer device or other common network node, and typically include (many or all of the elements described above relative to the computer 120, although only memory storage devices 150a and 150b and their associated application programs 136a and 136b have been illustrated in FIG. 1. The logical connections depicted in FIG. 1 include a local area network (LAN) 151 and a wide area network (WAN) 152 that are presented here by way of example and not limitation. Such networking environments are commonplace in office-wide or enterprise-wide computer networks, intranets and the Internet.

When used in a LAN networking environment, the computer 120 is connected to the local network 151 through a network interface or adapter 153. When used in a WAN networking environment, the computer 120 may include a modem 154, a wireless link, or other means for establishing communications over the wide area network 152, such as the Internet. The modem 154, which may be internal or external, is connected to the system bus 123 via the serial port interface 146. In a networked environment, program modules depicted relative to the computer 120, or portions thereof, may be stored in the remote memory storage device. It will be appreciated that the network connections shown are exemplary and other means of establishing communications over wide area network 152 may be used.

While FIG. 1 illustrates an example of a computing system that may implement the principles of the present invention, any computing system may implement the features of the present invention. In the description and in the claims, a "computing system" is defined as any hardware component or components that are capable of using software to perform one or more functions. Examples of computing systems include desktop computers, laptop computers, Personal Digital Assistants (PDAs), telephones, or any other system or device that has processing capability.

Figure 2:
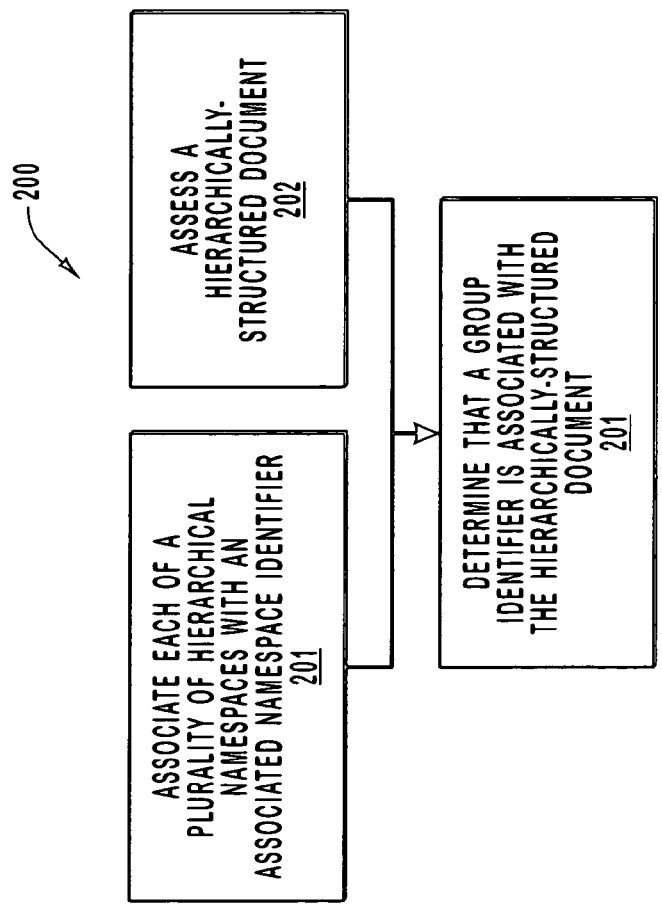
FIG. 2 illustrates a flowchart of a method for establishing a number of abbreviated namespace identifiers for a hierarchically-structured document.

FIG. 2 illustrates a flowchart of a method 200 for establishing a plurality of abbreviated namespace identifiers for a hierarchically-structured document in accordance with one embodiment of the present invention. The method 200 may be implemented by the computer 120 described above, or by any other computing system capable of implementing software that, when executed, implements the principles of the present invention as described and/or claimed herein.

The computing system has access to a hierarchically-structured document. In this description and in the claims, a hierarchically-structured document refers to a document that is formatted in accordance with a standard in which one element may be contained within or associated with another element in the document. One example of a hierarchically-structured document is a document such as an eXtensible Markup Language (XML) document. XML documents typically have a tree-structured of nested elements, although some XML elements only have one element. All XML documents fall within the definition of hierarchically-structured documents in this description and in the claims. When the computing system is the computer system 120 described above, the hierarchically-structured document may be, for example, program data 138 illustrated in FIG. 1. In this description and in the claims, a "hierarchical namespace" is defined as a namespace used within a hierarchically-structured document.

The method 200 includes an act of associating each of a plurality of hierarchical namespaces with an associated abbreviated namespace identifier (act 201), and an act of accessing a hierarchically-structured document (act 202). For example, the hierarchically-structured document may be read from persistent memory, or may be read from a hierarchically-structured document. Depending on which of the below-described embodiment is implemented, the act of association each of a plurality of hierarchical namespaces (act 201) may occur in any order either before or after the act of access the hierarchically-structured document (act 202). Next, the method includes an act of determining that a group identifier is associated with the hierarchically-structured document (act 203).

The group identifier represents that when any of the abbreviated namespace identifiers are found associated with an element in the hierarchically-structured document, that the associated namespace is also associated with that element. The following XML document illustrates an example data structure in which the group identifier is actually included within the XML document itself. Line numbering is once again added for clarity.

| | |
|---|---|
| 1. | <S:Envelope nsg="group map"> |
| 2. |    <S:Header> |
| 3. |       <p:policy>...</p:policy> |
| 4. |       <s:security>...</s:security> |
| 5. |       <t:timestamp>...</t:timestamp> |
| 6. |       <q:session>...</q:session> |
| 7. |       <r:reliability>...</r:reliability> |

-continued

```
8.              </S:Header>
9.              <S:Body>
10.                 <x:myElement xmlns:x="x uri">
11.                     ...
12.                 </x:myElement>
13.             </S:Body>
14.         </S:Envelope>
```

Assuming that the computing system has performed the act of previously associating each of the abbreviated namespace identifiers "S", "p", "s", "t", "q" and "r" with their corresponding namespace URI's, the data structure illustrated immediately above communicates the same information as the conventional data structure listed in the Background of the Invention section of this specification.

Note that unlike the conventional data structure, the data structure immediately above does not make an express namespace declaration associating the abbreviated namespace identifiers with a corresponding namespace URI. Instead, line 1 only identifies a group namespace identifier. The computing system interprets the presence of the group namespace identifier to be an indication that the associated abbreviated namespace identifiers "S", "p", "s", "t", "q" and "r" may be used to represent a corresponding namespace URI. Note that there was no need to expressly include the namespace URI in the XML data structure itself. Accordingly, the XML data structure immediately above is much more compact than the conventional data structure while communicating the very same information.

Rather than including the group namespace identifier within the XML document itself, the group namespace identifier may be included within a pre-processor directive. The following data structure illustrates such a pre-processor directive followed by the XML data structure that is to be applied to the group namespace identifier:

```
0.      <?NSG="group map">
1.      <S:Envelope>
2.          <S:Header>
3.              <p:policy>...</p:policy>
4.              <s:security>...</s:security>
5.              <t:timestamp>...</t:timestamp>
6.              <q:session>...</q:session>
7.              <r:reliability>...</r:reliability>
8.          </S:Header>
9.          <S:Body>
10.             <x:myElement xmlns:x="x uri">
11.                 ...
12.             </x:myElement>
13.         </S:Body>
14.     </S:Envelope>
```

Line 0 represents the pre-processor directive that specifies the group namespace identifier, while lines 1 through 14 represent the XML data structure that the associated group namespace mapping are to be applied to. The above examples in which the group namespace identifier is included within the XML document, or with the XML document in a pre-processor directive, are advantageous in that the group namespace identifier is applied as an option for each communicated data structure.

Alternatively, a group identifier may be established well in advance of accessing a hierarchically-structured data structure. The group namespace identifier may be applied by default using, for example, the schema definition document itself. The schema definition document may be, for example, an XML Schema Definition (XSD) document. For example the XSD document may have an attribute indicating the group namespace identifier is to be applied to one, some, or all elements defined by the XSD document. The attribute may, for example, take the form of "<schema useDefinedNamespaces="1"...>". For any given element defined by the XSD schema document, the element may carry that attribute for any namespace into which the element is exported. In this case, there would not be any need on a document-by-document basis to associate the group namespace identifier to a hierarchically-structured document to which the group namespace identifier is to be applied. Instead, for that element to which the group namespace identifier was specified in the schema definition, the computing system would thus use the group namespace identifier as a default setting.

Figure 3:
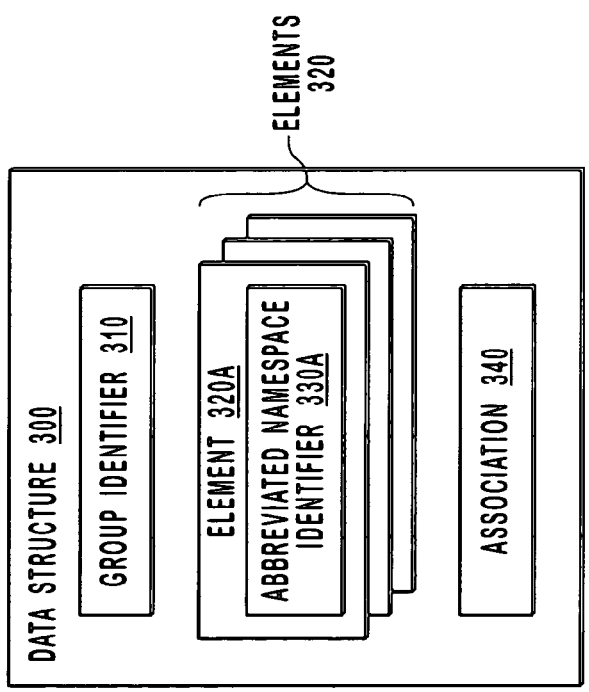
FIG. 3 illustrates a data structure of a hierarchically-structured document.

FIG. 3 illustrates a data structure 300 of a hierarchically-structured document. The data structure includes a group identifier data field 310 that represents that a number of abbreviated namespace identifiers are each to be associated with a corresponding hierarchical namespace. In one embodiment, there may be multiple data fields, each representing a different group identifier. The data structure 300 also includes one or more element data fields 320 that each represents a node in the hierarchical tree of the hierarchically-structured document. One or more of the element data fields have an abbreviated namespace identifier field. For example, element field 320A has a corresponding abbreviated namespace identifier field 330A.

The data structure 300 is used when the group identifier is included in the same hierarchically-structured document that the group identifier is applied to. However, as mentioned above, the group identifier might not be included in the hierarchically-structured document at all, as when a pre-processor directive is used, or when a default group identifier setting is obtained by parsing a schema definition document that defines one or more elements of the hierarchically-structured document as mentioned above. Accordingly, the lengthy namespace declarations that include the entire URI for a particular namespace need not be included at all in the hierarchically-structured document.

If there are namespaces to be used that do not fall within the associations made by the group identifier, they namespace declaration for that namespace may be made in the standard manner by using the entire URI. For example, in the above examples, line 10 illustrates a namespace declaration for the "x uri" in which the entire URI would be specified since the "x uri" is not part of the group namespace identifier. Still, other namespace declarations that related to namespaces that fall within the group namespace identifier need not be expressly included in the hierarchically-structured document. Accordingly, the size of the hierarchically-structured document may be significantly reduced.

As mentioned above, a default group identifier may be set by using the schema definition itself to set the group identifier for one or more elements in the hierarchically-structured document. Alternatively, however, a default group identifier may be set by having previously received a group namespace identifier setting and an express assignment of each of the number of abbreviated namespace identifiers with a corresponding namespace URI. The group namespace identifier may have been included in a previously received hierarchically-structured document. In that case, the hierarchically structured document may also include an association field 340 for each of one or more group namespace identifiers. The association field 340 identifies a number of abbreviated namespace identifiers with a corresponding namespace URI. This allows for two or more computing systems to agree on what formal namespace declarations are to be made corresponding to one or more particular group identifiers are specified in a future message. Additionally, this allows for two or more computing system to agree on default namespace declarations to be made even when no group namespace identifier is expressed in the hierarchically-structured message. The two or more computing systems may change the namespace declarations associated with a group identifier by exchanging messages including an expression of the new namespace declarations associated with a group namespace identifier. Accordingly, the corresponding namespace declarations associated with a particular group namespace identifier may change over time in a dynamic manner.

In these examples, although only one group identifier is described as being associated with a hierarchically-structured document, there may be several group identifiers associated with a hierarchically-structured document in accordance with the principles of the present invention. In that case, each group identifier would represent one or more namespace associations.

In accordance with another embodiment of the present invention, a schema description language document may specify multiple target namespaces for a single element. Accordingly, groupings of elements may be included in different namespaces to create overlapping or even nested namespaces. This allows for the efficient and flexible generation of namespaces and provides for a wider selection or hierarchical organization of namespaces.

Figure 4:
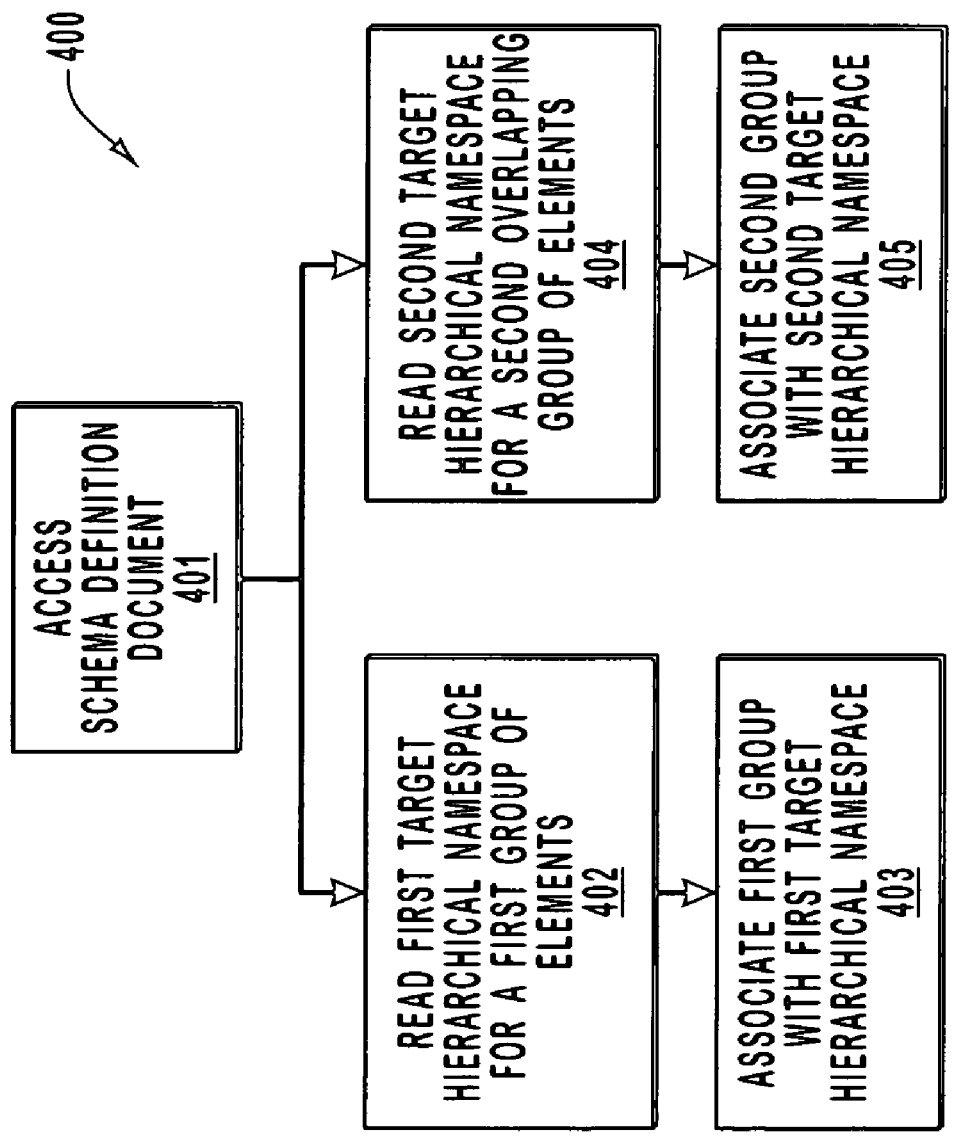
FIG. 4 illustrates a method for constructing overlapping namespaces.

FIG. 4 illustrates a flowchart of a method 400 for developing hierarchical namespaces having at least one overlapping element. The method involves schema definition document and namespaces. The schema definition document may be, for example, an XSD document. Conventionally, elements defined by a schema definition document were assigned to only one namespace. However, in accordance with the principles of the present invention, the schema definition document assigns each of one or more elements into two or more namespaces. This allows for the convenient construction of nested and overlapping namespaces.

The method includes an act of accessing a schema definition document (act 401). As previously mentioned, this schema definition document may be an XSD document. Then, the method includes an act of reading a first target hierarchical namespace associated with a first group of one or more elements of the schema definition document (act 402) followed by an act of associating the first group of one or more elements of the schema definition document with the first hierarchical target namespace (act 403). The method 400 also includes an act of reading a second target hierarchical namespace associated with a second group of one or more elements of the schema definition document (act 404) followed by an act of associating the second group of one or more elements of the schema definition document with the second target hierarchical namespace (act 405). At least one overlapping element is both an element of the first group and of the second group.

Figure 5B:
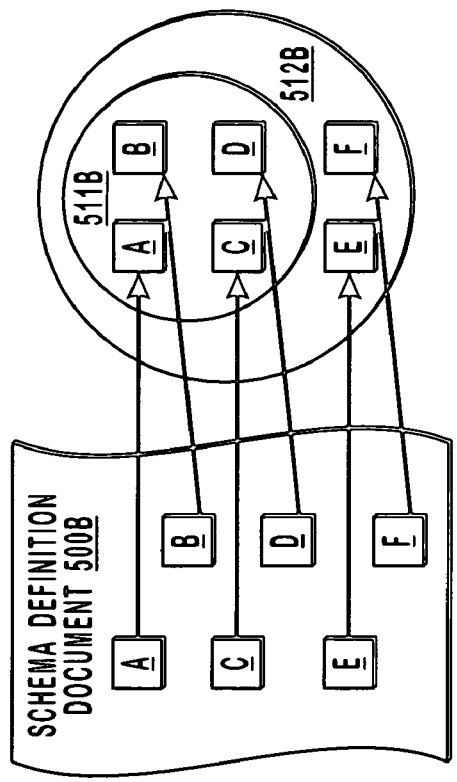
FIG. 5A through 5C each illustrates a specific example in which a schema definition document creates various configurations of overlapping namespaces.
Figure 5A:
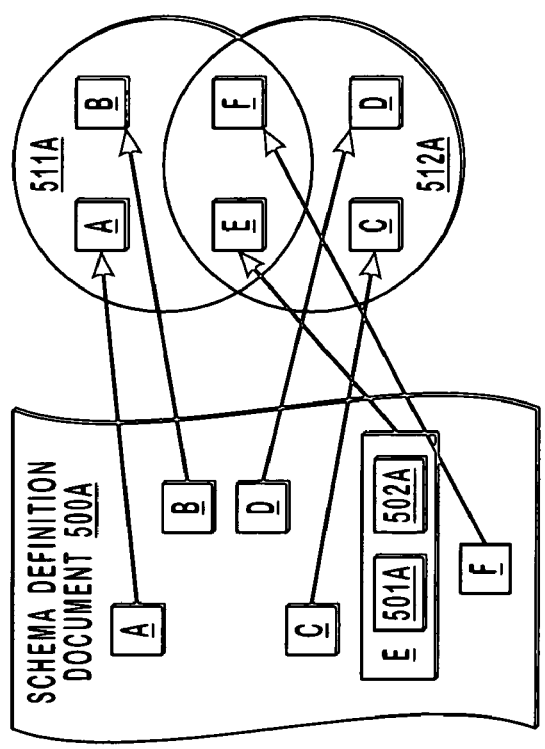

FIG. 5A illustrates a schema definition document 500A having elements A, B, C, D, E and F. The schema definition document assigns each of the elements into potentially one or even more target namespaces. The potential target namespaces for FIG. 5A include target namespace 511A and target namespace 512A. In FIG. 5A, upon being parsed by the schema parser (e.g., one of the other program modules illustrated in FIG. 1) elements A and B are assigned only to namespace 511A, elements C and D are assigned only to namespace 512A and elements E and F are assigned to both namespaces 511A and 512A. The elements E and F are assigned to both namespaces within a single element definition in the schema definition document. For example, element E may include or be associated with a first target namespace field 501A that represents that the target hierarchical namespace 511A is associated with element E (and potentially other elements as well such as elements A, B and F). A second target namespace field 502A represents that the second target hierarchical namespace 512A is associated with element E (and potentially other elements as well such as elements C, D and E). These fields 501A and 502B may be combined within a single attribute field using a single attribute such as "target namespaces=http://www.namespace511A.org, http://www.namespace512A.org". Alternatively, the two fields may each have a target namespace attribute field such as "target namespace="http://www.namespace511A.org" and "http://www.namespace512A.org". The schema parser at the computing system would be modified to recognize such an attribute in which multiple target namespaces are assigned to one element in an XSD or other schema definition document.

FIG. 5B illustrates an alternative schema definition document 500B in which the target namespace 512A includes all of the elements of target namespace 511A. Note that elements A, B, C and D are all assigned to both of the namespaces 511B and 512B, while only elements E and F are assigned to just namespace 512B. Accordingly, the namespace 511B represents a subset of the elements in the namespace 512B. In other words, the namespace 511B is nested within the namespace 512B.

Figure 5C:
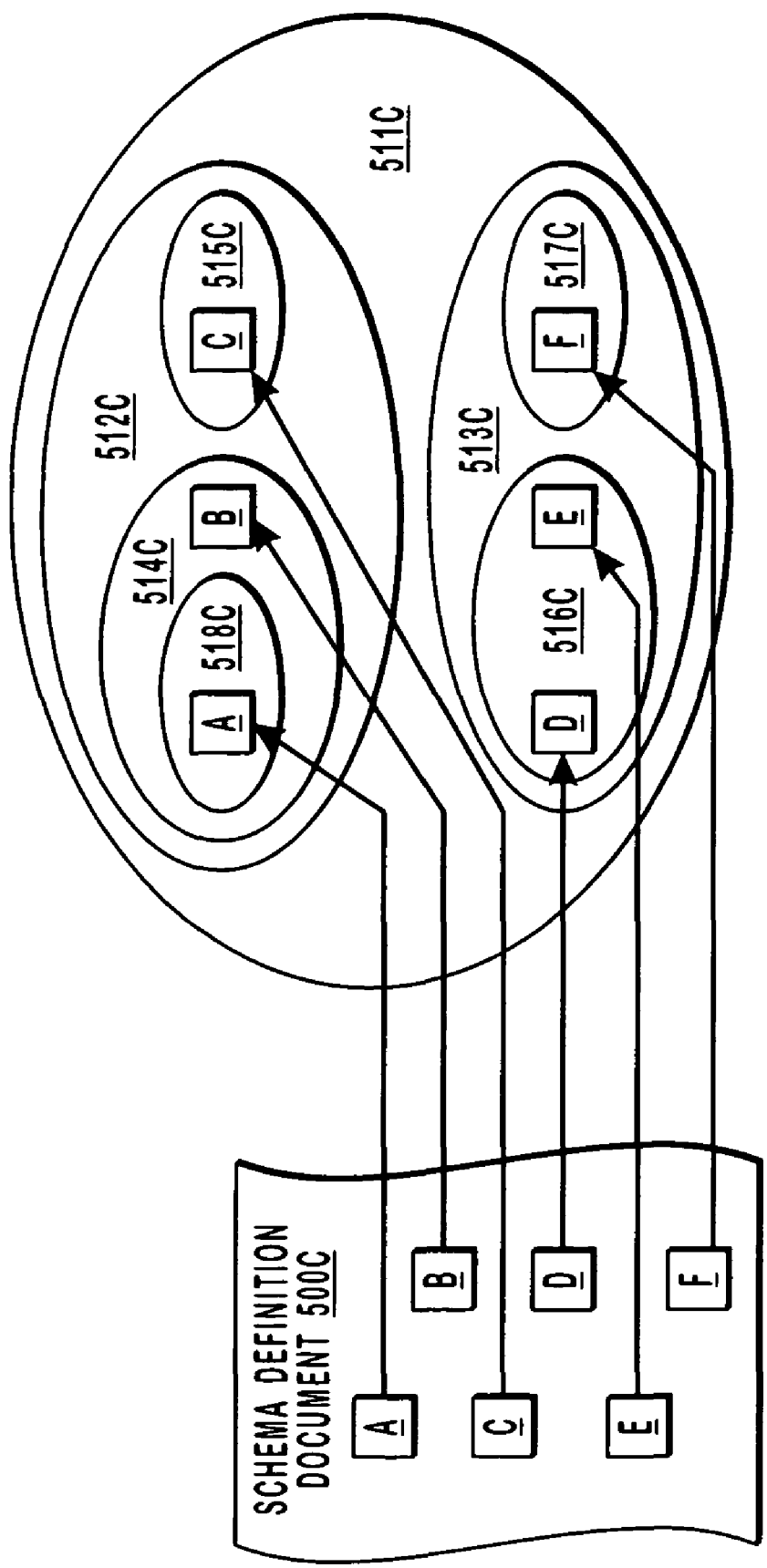

FIG. 5C illustrates an alternative schema definition document 500C that may construct a four-tier nesting of namespaces. The highest tier is namespace 511C and includes all six elements A, B, C, D, E and F. There are two second tier namespaces 512C and 513C. One second tier namespace 512C includes elements A, B and C, while the other second tier namespace 513C includes elements D, E and F. A third tier element 514C includes elements A and B, while a third tier element 515C includes just element C. A third tier element 516C includes elements D and E, while a third tier element 517C includes just element F. A fourth tier element 518C includes just element A.

The examples of FIG. 5A through FIG. 5C represent mere examples of how multiple target namespaces may be associated with a single element of a schema definition document in order to generate an organized overlapping and nesting of namespaces. For example, a first tier namespace may include any personal information management elements, one second tier namespace may include just one type of personal information management elements (namely, contacts), while another second tier namespace may include another type of personal information management elements (namely, calendar information). A third tier namespace nested within the second tier contacts namespace may include address elements that are structured to accommodate Japanese addresses, while another third tier namespace also nested within the second tier contacts namespace may include address elements that are structured to accommodate United States addresses, and so forth. Accordingly, namespaces may be efficiently organized and structured.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed is:

1. At a computing system comprising a processor operatively coupled to a memory, a computer implemented method for developing hierarchical XML namespaces having at least one overlapping element, the method-accessing an XML Schema Definition (XSD) document;

accessing an XML Schema Definition (XSD) document;

reading a first target hierarchical XML namespace associated with a first group of one or more elements of the XSD document, the first target hierarchical XML namespace comprising a first namespace URI;

associating the first group of one or more elements of the definition XSD document with the first hierarchical target XML namespace as well as a first abbreviation corresponding to the first target hierarchical XML namespace;

reading a second target hierarchical XML namespace associated with a second group of one or more elements of the XSD document the second target hierarchical XML namespace comprising a second namespace URI; and associating the second group of one or more elements of the XSD document with the second target hierarchical XML namespace as well as a second abbreviation corresponding to the second target hierarchical XML namespace, wherein at least one overlapping element is both an element of the first group and of the second group, thereby associating the at least one overlapping element with both the first namespace URI and the second namespace URI and the first and second abbreviations; and associating a group identifier with the first and second abbreviations, such that when the group identifier is used in an XML document, elements associated with the first abbreviation are associated with the first target hierarchical XML namespace and the first namespace URI and elements associated with the second abbreviation are associated with the second target hierarchical XML namespace and the second namespace URI;

wherein the first group of one or more elements comprises all of the elements in the XSD document including all of the second group of one or more elements, thereby nesting the second target hierarchical XML namespace with its associated second namespace URI within the first target hierarchical XML namespace with its associated first namespace URI.

2. A method in accordance with claim 1, wherein the second group of one or more elements are all an element of the first group of one or more elements.

3. The method of claim 1, wherein the XSD document is contained within a pre-processor directive.

4. The method of claim 3, wherein the pre-processor directive is expressed the form "<?NSG="X">" with the term "X" being replaceable by an identification of the XSD document.

5. A computer non-transient storage media storing executable instructions which, when executed by one or more processors of a computing system implement the method recited in claim 1.

* * * * *